(12) United States Patent
Fujita (10) Patent No.: US 7,480,026 B2
(45) Date of Patent: Jan. 20, 2009

(54) ELECTRO-OPTICAL DEVICE AND ELECTRONIC APPARATUS

(75) Inventor: Shin Fujita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 276 days.

(21) Appl. No.: 11/010,429

(22) Filed: Dec. 14, 2004

(65) Prior Publication Data

US 2005/0127386 A1    Jun. 16, 2005

(30) Foreign Application Priority Data

Dec. 16, 2003   (KR) .............................. 2003-418015

(51) Int. Cl.
*G02F 1/1345*   (2006.01)

(52) U.S. Cl. ......................... 349/149; 349/152; 257/88; 257/E23.141

(58) Field of Classification Search ......... 349/139–152; 257/88–89, 93, E23.141, E23.142; 438/34–35, 438/598–599
See application file for complete search history.

(56) References Cited

U.S. PATENT DOCUMENTS

| | | | | |
|---|---|---|---|---|
| 5,530,568 | A | * | 6/1996 | Yamamoto et al. ........... 349/143 |
| 5,872,610 | A | * | 2/1999 | Kobayashi ................... 349/139 |
| 5,986,723 | A | * | 11/1999 | Nakamura et al. ............ 349/39 |
| 6,198,522 | B1 | * | 3/2001 | Yanagi ........................ 349/152 |
| 6,522,378 | B1 | * | 2/2003 | Mizuno et al. .............. 349/139 |
| 6,828,817 | B2 | | 12/2004 | Fujita |
| 6,862,071 | B2 | | 3/2005 | Fujikawa |
| 2001/0030729 | A1 | * | 10/2001 | Onishi ......................... 349/151 |
| 2002/0027634 | A1 | * | 3/2002 | Kang et al. .................. 349/150 |
| 2002/0044242 | A1 | * | 4/2002 | Kim ............................. 349/139 |
| 2002/0145697 | A1 | * | 10/2002 | Hoshina ...................... 349/151 |
| 2002/0191140 | A1 | * | 12/2002 | Eguchi et al. ............... 349/149 |
| 2003/0103184 | A1 | * | 6/2003 | Nishino ....................... 349/149 |
| 2003/0128326 | A1 | * | 7/2003 | Yamaguchi et al. ......... 349/152 |
| 2003/0174271 | A1 | * | 9/2003 | Fujikawa .................... 349/149 |
| 2003/0180975 | A1 | * | 9/2003 | Fujita .......................... 438/17 |
| 2003/0227592 | A1 | * | 12/2003 | Izumi et al. ................. 349/149 |
| 2004/0165138 | A1 | * | 8/2004 | Hwang et al. ............... 349/152 |
| 2004/0239863 | A1 | * | 12/2004 | Liou et al. ................... 349/152 |
| 2005/0157244 | A1 | * | 7/2005 | Hwang et al. ............... 349/151 |

FOREIGN PATENT DOCUMENTS

JP    B2 2822558    9/1998

(Continued)

*Primary Examiner*—Douglas M Menz
*Assistant Examiner*—Matthew W Such
(74) *Attorney, Agent, or Firm*—Oliff & Berridge PLC (57) ABSTRACT

To secure a wide mounting area on liquid crystal device and the like to miniaturize the overall size of the device in a highly precise manner. The electro-optical device comprises a substrate; a plurality of pixel units which are disposed in an image display region on the substrate and are driven by drive signals; a plurality of terminals which are arranged in one polygon-shaped region that is located in a portion along one side of the image display region in a peripheral region thereof located around the image display region on the substrate in such a manner that the terminals are arranged along plural sides of the one region; and a mounting component which is mounted onto at least some terminals among the plurality of terminals and which supplies the drive signal to the plurality of pixel units through the at least some terminals.

8 Claims, 9 Drawing Sheets

FOREIGN PATENT DOCUMENTS

| | | |
|---|---|---|
| JP | A-11-297760 | 10/1999 |
| JP | A-11-307902 | 11/1999 |
| JP | A-2000-81635 | 3/2000 |
| JP | A-2003-66113 | 3/2003 |
| JP | A-2003-215628 | 7/2003 |
| JP | A-2003-233331 | 8/2003 |
| JP | A-2003-255388 | 9/2003 |
| JP | A-2003-271067 | 9/2003 |
| JP | A-2003-271070 | 9/2003 |
| JP | A-2003-287769 | 10/2003 |
| WO | WO 9950708 A1 * | 10/1999 |

* cited by examiner

FIG.6
1:LIQUID CRYSTAL DEVICE

ELECTRO-OPTICAL DEVICE AND ELECTRONIC APPARATUS

BACKGROUND

The present invention is related to an electro-optical device such as an organic EL (Electro-Luminescent) device and to an electronic apparatus having the electro-optical device.

Generally, an electro-optical device comprises, for example, an internal drive circuit formed on a substrate, and a plurality of terminals electrically connected to the internal drive circuit. Further, a mounting component is mounted with respect to the plurality of terminal, and at the same time, a predetermined type of signal is supplied from an external drive circuit connected to the mounting component. Thus, based on the predetermined type of signal supplied through the plurality of terminals, a plurality of pixel units are driven by the internal drive circuit. With the advances in miniaturization and in high precision of the electro-optical device, the number of the signals supplied from external drive circuit is generally increased. As such, in the electro-optical device, since the number of terminals provided on the substrate is also increased, there is a significant problem in that an area for accommodating the plurality of terminals must be provided, i.e., a mounting area.

There is disclosed a technology, in which a mounting area is secured by disposing a plurality of terminals with a narrow pitch between the terminals, or a plurality of mounting areas are secured by providing a plurality of areas on a substrate and arranging a plurality of terminals in the respective regions without any change in the pitch between the terminals. (Reference can be made to Patent Document 1, for example)

[Patent Document 1] Japanese Patent No. 2822558

SUMMARY

However, when the pitch between terminals is made to be narrow, it is difficult to align the mounting component and the plurality of terminals. Therefore, poor mounting is generated due to the positional shift which occurs at the time of mounting the mounting component, and there is a possibility that the terminals are short-circuited. Further, when a probing is performed during the inspection process, the alignment of a probe pin and the plurality of terminals becomes difficult, and the probe pin often disconnects from the terminals, which causes a problem in that an accurate inspection cannot be carried out.

Moreover, when a plurality of mounting areas are to be secured, since a plurality of mounting components are required, there resides a problem that the mount time and production cost are increased proportionately to the number of the mounting components.

The present invention is made in view of the above-mentioned problems, and it is an object of the present invention to provide an electro-optical device and various kinds of electronic apparatuses having incorporated with the electro-optical device, which are capable of securing a mounting area and making them in a miniaturized and highly precise manner.

According to a first aspect of the present invention, the electro-optical device comprises a substrate; a plurality of pixel units which are disposed in an image display region on the substrate and are respectively driven by drive signals; a plurality of terminals which are arranged in one polygon-shaped region that is located in a portion along one side of the image display region in the peripheral region located around the image display region on the substrate and which are arranged along plural sides of the one region; and a mounting component which is mounted onto at least some terminals among the plurality of terminals and which supplies the drive signal to the plurality of pixel units through the at least some terminals.

In the first electro-optical device according to the first aspect of the present invention, the one region having a polygonal planar shape on the substrate, corresponds to a mounting area where terminals are formed, and a plurality of terminals are provided along any one of or all of the plural sides of the one region. Therefore, when it is difficult to arrange the entire plurality of terminals to one side of the one region, the terminals incapable of being arranged to the one side can be arranged to other side of the one region. It becomes possible to arrange the entire plurality of terminals onto the plural sides of the one region without narrowing the pitch between terminals.

Further, it becomes possible to change the size of the one region by extending or compressing the substrate to only one side of the image display region. Therefore, compared to the case where an area for the plurality of mounting areas are secured by extending the substrate to each side of the image display region, it is advantageous when the first electro-optical device is downsized with respect to a specific direction (for example, width direction thereof).

Further, by arranging the plurality of terminals in the one region without narrowing the pitch therebetween, it becomes possible to make the alignment of the plurality of terminals and the wires by the side of the mounting component relatively easily and correctly. It is thus possible to prevent poor mounting of the mounting component. As a result, the first electro-optical device can be manufactured at low cost and it becomes possible to improve the yield in this manufacturing process further.

The layout of the plurality of wires connected to the plurality terminals on the one region corresponds to the arrangement of the plurality of terminals. Therefore, by such arrangement of the plurality of terminals, it becomes possible to reduce a situation where the plurality of wires are crossed by one another and to prevent the noise generation when they are driven.

As explained above, according to the first electro-optical device of the present invention, it is particularly advantageous when making it with a small size and with high definition.

In one aspect of the first electro-optical device of the present invention, the plurality of terminals are at least partially arranged in a zigzag.

According to this aspect, when it is difficult to arrange the entire plurality of terminals to each sides of the one region in a sequence, it is preferable to arrange the terminals, which cannot be arranged, in a zigzag. Therefore, it becomes possible to increase the number of terminals that can be arranged to the one region without narrowing the pitch between terminals. Therefore, the number of terminals that can be arranged to the one region can be increased by extending the substrate to one side of the image display region and changing the size of substrate.

In another aspect of the first electro-optical device of the present invention, the mounting component is mounted onto only some terminals among the plurality of terminals.

According to this aspect, the mounting component is mounted onto only a terminal for drive signals. Therefore, downsizing of the mounting component can be attained, and the production cost of the mounting component can be reduced, and also it becomes possible to shorten the mounting time. Moreover, since the alignment of the terminals for the drive signal and the wires at the mounting component side can be performed relatively easily and correctly, it becomes possible to prevent poor mounting of the mounting component.

In the above aspect where the mounting component is mounted onto a part of terminal, the some terminals may be arranged along plural sides of the one region.

By such arrangement, even when the some terminals are arranged along plural sides of the one region, since the some terminals have only one mounting component mounted thereon, it becomes possible to shorten mounting time thereof and to cut down cost taken in the production and mounting of the mounting component. Moreover, by the arrangement of the some terminals, it becomes possible to reduce a situation where the plurality of wires connected to the some terminals are crossed by one another and to prevent the noise generation when they are driven.

In the above aspect where the mounting component is mounted onto the some terminals, the some terminals may be arranged along only one side of the plural sides of the one region.

By such arrangement, downsizing of the mounting component can be attained, and the production cost of the mounting component can be reduced, and also it becomes possible to shorten the mounting time.

In the above aspect where the mounting component is mounted onto the some terminals, other terminals excluding the some terminals among the plurality of terminals may have an inspection terminal.

By such arrangement, alignment of a probe pin and the inspection terminal can become relatively easy during inspection operation. As a result, a situation can be prevented where the probe pin is omitted from the inspection terminal during the inspection, and thus more exact inspection can be conducted. In addition, when mounting a mounting component, the connection with the inspection terminal is not required to be taken into consideration, and as a result, a margin for the planar shape in the mounting component and layout of wires is increased. Also, at the time of mounting, since the alignment is required with respect to only the some terminals, the alignment can be preformed relatively easy.

In the above aspect where the other terminals of the plurality of terminals have an inspection terminal, the inspection terminal may have a relatively larger size than those of both the other terminals excluding the inspection terminal and the some terminals.

By such arrangement, it becomes possible to perform the alignment of a probe pin relatively easily, and to prevent a probe pin from omitted from the inspection terminal at the time of inspection. In addition, if a dedicated device is separately used to perform the alignment at the time of mounting the mounting component, more precise operation can be performed compared to the case of a probe pin and problems would not be produced at all. Moreover, it becomes possible by enlarging size of a terminal in this way to reduce the resistance in the terminal.

In still another aspect of the first electro-optical device of the present invention, when the substrate is seen in plan view, the terminals which are arranged along the other side of the one region have relatively thicker wires connected thereto compared to the wires that are connected to the terminals which are arranged along one side of the one region that faces one side of the image display region.

In the above aspect, it is possible to arrange a plurality of wires connected to the plurality of terminals with a good balance as follows. That is, in this aspect, it is possible to arrange relatively thin wires inside the one region which faces the image display region compared to an outer side, and to arrange relatively thick wires on the outside of the one region compared to an inner side.

In the above aspect where the terminals which are arranged along the other side of the one region have relatively thicker wires connected thereto, the first electro-optical device of the present invention further comprises a counter substrate arranged to face the substrate; and two electrodes which are located on the substrate and the counter substrate and which have an electro-optical material interposed therebetween, wherein the terminals arranged along the other side of the one region are electrically connected to the electrode provided to the counter substrate by means of the wires.

By such arrangement, for example since the length of the wires which connects electrically between the vertical conducting terminal connecting two electrodes electrically, and the terminals arranged along the other side of the one region can be shortened respectively and the wires are thick, it becomes possible to reduce the resistance in the wires. For this reason, it becomes easy to maintain the counter substrate at a stable predetermined potential.

In still another aspect of the first electro-optical device of the present invention, an external drive circuit for generating the drive signal is connected to the mounting component.

In the above aspect, the external drive circuit is manufactured through a different process from the first electro-optical device and is connected to the mounting component. Therefore, by mounting such a mounting component onto the first electro-optical device, it becomes possible to improve the yield in the manufacturing process thereby further increasing design of freedom.

According to a second aspect of the present invention, the electro-optical device comprises a substrate; a plurality of pixel units which are disposed in an image display region on the substrate and are respectively driven by image signals and scan signals; a plurality of data lines and a plurality of scanning lines which are electrically connected to the plurality of pixel units; a plurality of terminals which are arranged in one polygon-shaped region that is located in a portion along one side of the image display region in the peripheral region located around the image display region on the substrate, in such a manner that the terminals are arranged along plural sides of the one region; an internal drive circuit which is located in the peripheral region, having a data line drive circuit that supplies the image signals to the plurality of data lines and a scanning line drive circuit that supplies the scan signals to the plurality of scanning lines; and a mounting component which is mounted on at least some terminals among the plurality of terminals and which supplies a predetermined type of signal to the internal drive circuit through the at least some terminals.

As described above, the second electro-optical device is particularly advantageous when making it with a small size and with high definition similar to the first electro-optical device.

Moreover, in the second electro-optical device of the present invention, a timing generating circuit controlling timings concerning the drive of each pixel units, an image signal processing circuit generating image signals based on externally input image data, or a power supply circuit supplying a power can be assembled into a mounting component. In this case, various type of timing signals are generated as "various type of signal" by the timing generating circuit. Alternatively, image signals generated by the image signal processing circuit. Further, data line drive circuit is driven by the power supplied through at least the some terminals among the plurality of terminals, and at the same time, supplies the image signals based on the various type of timing signals supplied through the some terminals. Moreover, the scanning line drive circuit, in a similar manner to the data line drive circuit, generates and outputs scan signals.

In each pixel unit, the scan signals are applied from the scanning line drive circuit, and the image signals supplied from the data line drive circuit are written. Then, the pixel units display an image based on the image signals supplied thereto.

The electronic apparatus according to the present invention includes the first or the second electro-optical device (and including each element thereof) as described above.

The electronic apparatus according to the present invention comprises the first or the second electro-optical device as described above, and can embodied in various types of electronic apparatuses capable of downsizing and high precision, including such as projection type display device, television, portable phone, electronic notebooks, word processors, view finder type or monitor direct view type video recorders, workstations, TV phones, POS terminals, and devices equipped with touch panel and the like. In addition, as an electronic apparatus in the present invention, it is also possible to realize it in an electrophoresis device such as an electronic paper, electronic discharge device (Field Emission Display and Conduction Electron-Emitter Display), etc.

The above and other features and advantages of the present invention will become more apparent by describing in detail exemplary embodiments explained below.

DETAILED DESCRIPTION OF EMBODIMENTS

Hereinafter, the embodiments according to the present invention will be described with a reference to the accompanying drawings. In the following embodiments, the electro-optical device according to the present invention is applied to the liquid crystal device.

<1: Entire Construction of Electro-Optical Panel>

Figure 1:
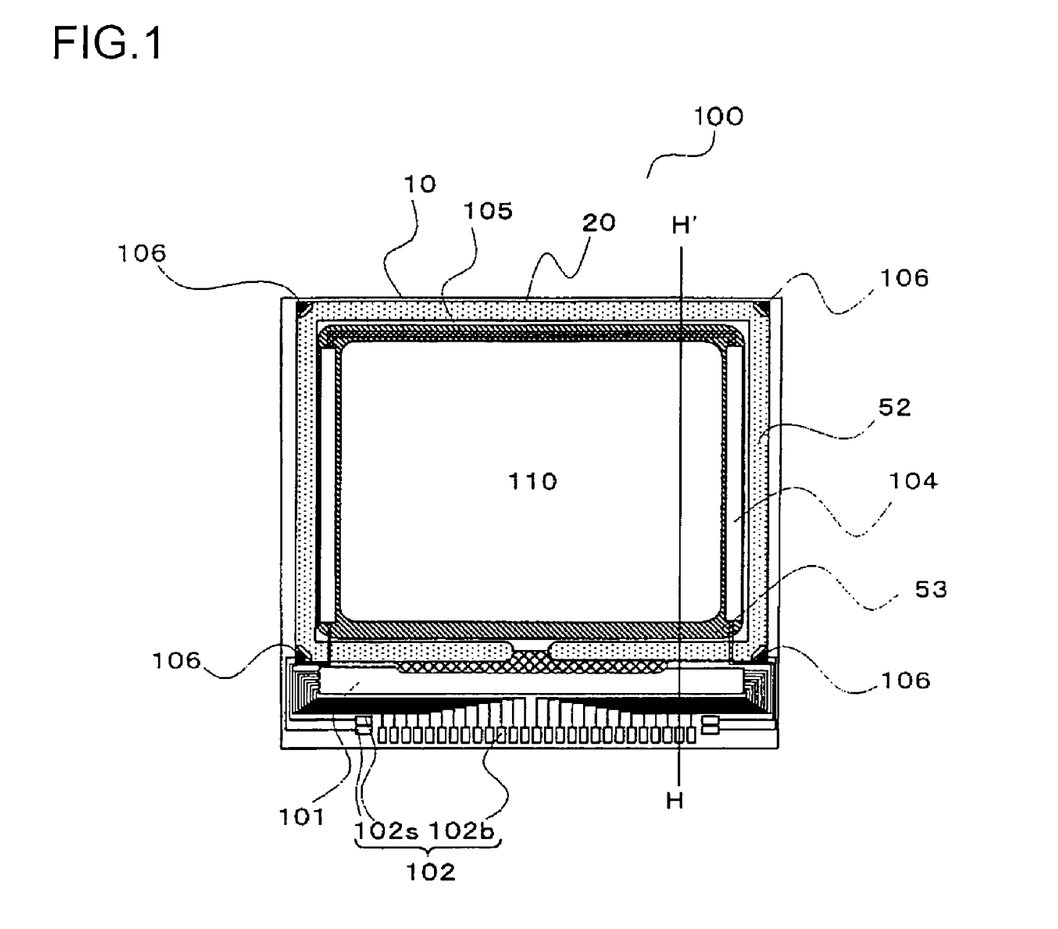
FIG. 1 is a schematic plan view of a liquid crystal panel.
Figure 2:
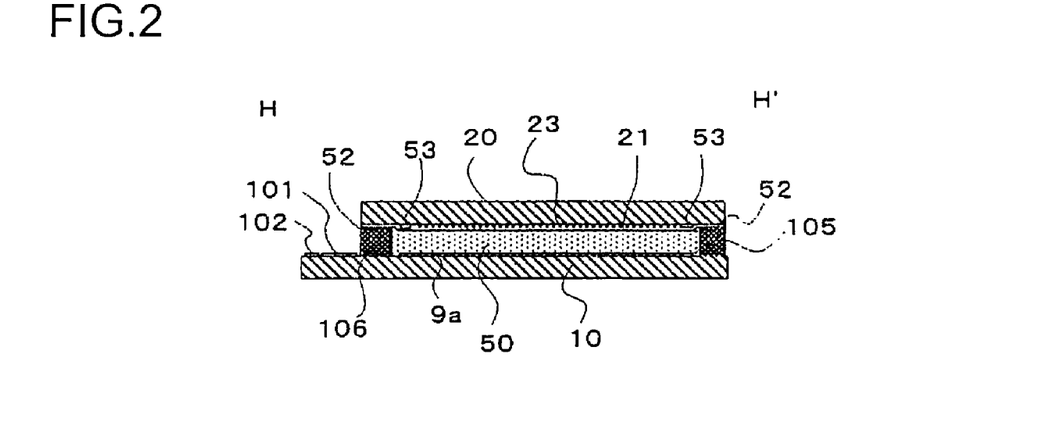
FIG. 2 is a sectional view taken along a line H-H' in FIG. 1.

In a liquid crystal device that is an example of the electro-optical device according to the present invention, the entire construction of the liquid crystal panel being an example of an electro-optical panel will be described, with reference to FIGS. 1 and 2. Here, FIG. 1 is a schematic plan view of the liquid crystal panel when a TFT array substrate and the respective components formed thereon is seen from the counter substrate side, and FIG. 2 is a sectional view taken along line H-H' in FIG. 1. In this example, a TFT active matrix type liquid crystal device, which has a drive circuit built-in, is being exemplified.

In FIGS. 1 and 2, the liquid crystal panel 100 of this embodiment comprises a TFT array substrate 10 and a counter substrate 20 which are disposed to face each other. The TFT array substrate 10 and the counter substrate 20 have a liquid crystal layer 50 inserted therebetween, and the TFT array substrate 10 and the counter substrate 20 are adhered to each other by means of a sealing member 52 provided to a seal region located around the image display region 110.

The sealing member 52 is made of materials such as an UV (ultra violet) cure resin, a thermosetting resin or the like for sticking both substrates together, and is the one that is applied on the TFT array substrate 10 in the manufacturing process and thereafter is cured by the UV exposure, heating or the like. Further, in the sealing member 52, there are dispersed gap materials such as glass fibers or glass beads, etc. for making the spacing between the TFT array substrate 10 and the counter substrate 20, that is an inter-substrate gap, to be a predetermined value.

In parallel with inner-side of the seal region where the sealing member 52 is provided, a light-preventive frame shape light shielding film 53, which defines a frame region of the image display region 110, is provided in the counter substrate 20 sides. However, in the frame shape light shielding film 53, a portion or the entire portion thereof may be provided to the TFT array substrate 10 as a self-contained light shielding film. In this embodiment, a peripheral region is located around the periphery of the image display region 110. In other words, especially in this embodiment, when seen from the center of the TFT array substrate 10, the region that is located farther than the frame shape light shielding film 53 is defined as a peripheral region.

In a region located in the outer side of the seal region where the sealing member 52 is provided, a data line drive circuit 101 is provided along one side of the image display region 110, and a plurality of terminals 102 is provided in one region along the one side of the image display region 110, on the peripheral region on the TFT array substrate 10. Further, two scanning line drive circuits 104 are provided to cover the frame shape light shielding film 53 along two sides that are adjacent to the one side of the image display region 110. Furthermore, in order to connect each of the two scan line drive circuits 104 provided on the image display region 110, a plurality of wires 105 are provided to cover the frame shape light shielding film 53 along the other side of the image display region 110. Here, with respect to a plurality of terminals 102, a mounting component is mounted by means of TAB (Tape Automated Bonding) as will be described later.

In addition, in the four corner portions of the counter substrate 20, vertical connecting members 106 which serve as vertical conducting terminals for conducting the top and bottom of both substrates is formed. On the other hand, in the TFT array substrate 10, the vertical conducting terminals are provided on the regions that are respectively opposite to those corner portions. By such arrangement, it becomes possible to provide an electrical connection between the TFT array substrate 10 and the counter substrate 20.

In FIG. 2, on the TFT array substrate 10, an alignment film is formed on the pixel electrode 9a having wires such as scanning lines, data lines, etc. and TFT for pixel switching formed thereon. On the other hand, an opposing electrode 21 and a light shielding film 23 of a grid or stripe form are formed on the counter substrate 20, with an alignment film in the uppermost layer. Moreover, the liquid crystal layer 50 is made of a liquid crystal mixed with one or plural type of nematic liquid crystal as an example of the electro-optical material, and makes a predetermined alignment state between this pair of alignment films.

On the TFT array substrate 10 shown in FIGS. 1 and 2, in addition to the data line drive circuit 101, scanning line drive circuit 104 and the like, other circuits may also be formed including a sampling circuit that samples image signals on the image signal lines and supplies them to the data lines, a precharge circuit that supplies precharge signals having a predetermined voltage level to the plurality of data lines prior to the supply of the image signals, and an inspection circuit for inspecting the quality and faults of the liquid crystal panel 100 during the manufacturing process and at the time of the shipment.

In stead of forming a portion of or the entire portion of the peripheral circuits such as the data line drive circuit 101 and the scanning line drive circuit 104 in the TFT array substrate 10, for example, such arrangements can also be contemplated where an IC chip for driving is, by means of TAB for example, electrically or mechanically connected through an anisotropic conductive film that is provided on a predetermined location in the TFT array substrate 10, or the arrangement where an IC chip for drive is, by means of COG (Chip On Glass), electrically or mechanically connected through anisotropic conductive film that is provided on a predetermined location in the TFT array substrate 10.

<2: Entire Construction of Electro-Optical Device>

Figure 3:
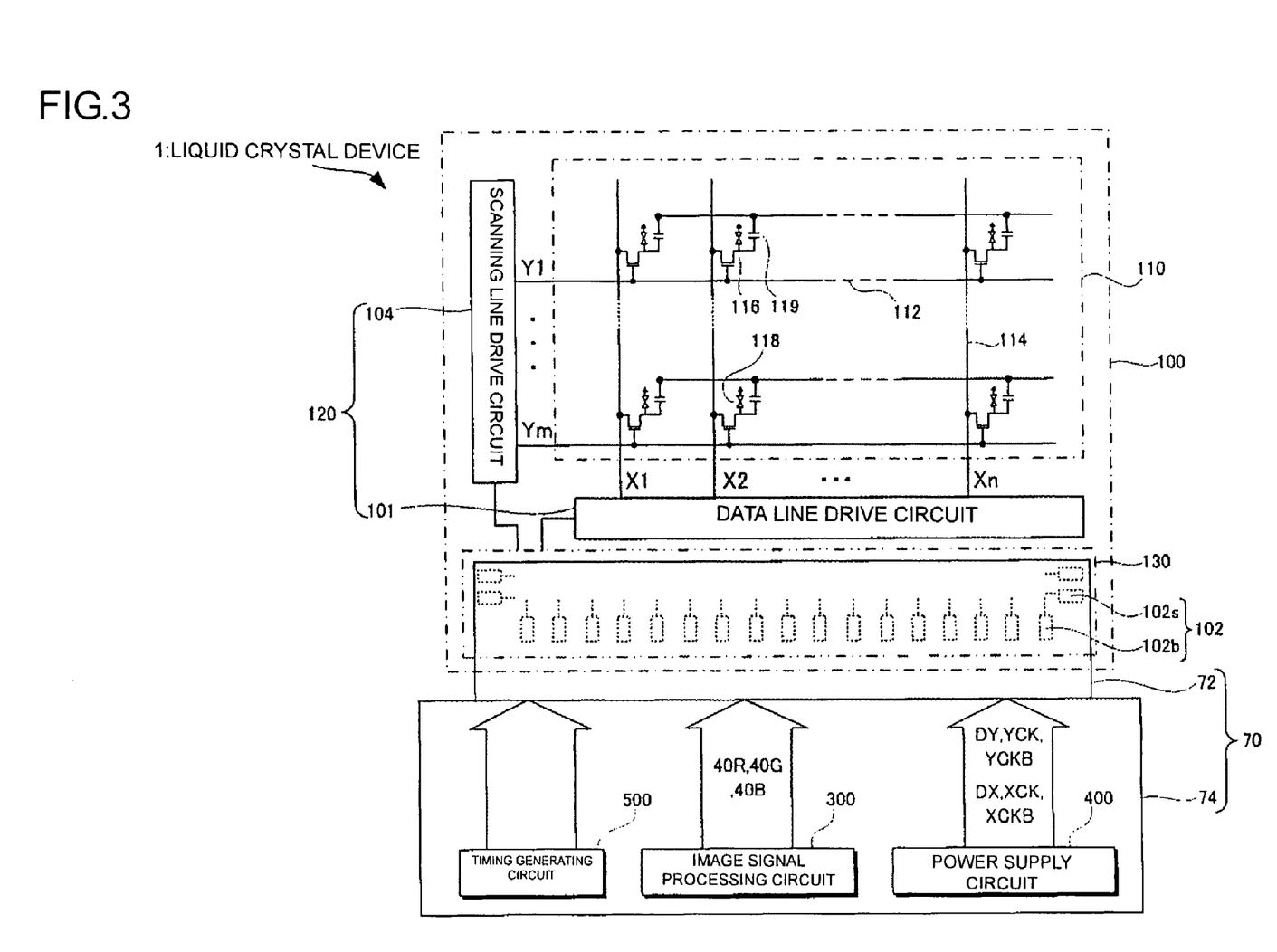
FIG. 3 is a block diagram showing the entire construction of the liquid crystal device.

FIG. 3 is a block diagram showing the entire construction of the liquid crystal device 1. In FIG. 3, the liquid crystal device 1 comprises a liquid crystal panel 100 and a mounting component 70 that is mounted on the liquid crystal panel 100 as a main part thereof. In FIG. 3, the mounting component 70 is mounted on the liquid crystal panel 100 by means of TAB.

The mounting component 70 comprises a flexible substrate 72 having a plurality of wires provided thereon and an external substrate 74 mounted on the flexible substrate 72. On the external substrate 74, an image signal processing circuit 300, timing generating circuit 400 and power supply circuit 500 are provided as an "external drive circuit" related to the present invention. In FIG. 3, the detail construction of the plurality of wires formed on the flexible substrate 72 will be omitted.

The timing generating circuit 400 is constructed to output various kind of timing signals that are used in each component. By a timing signal output means that is a part of the timing generating circuit 400, dot clocks for scanning each pixel which corresponds to a minimum clock unit are produced and a Y clock signal YCK, an inverted Y clock signal YCKB, an X clock signal XCK, an inverted X clock signal XCKB, a Y start pulse DY and an X start pulse DX are generated based on the dot clocks.

When input image data are inputted from external, the image signal processing circuit 300 generates a R signal 40R, a G signal 40G and a B signal 40B as an image signal, corresponding to each color of RGB based on the input image data. The power supply circuit 500 generates a power having a plurality of potential levels.

Next, on the liquid crystal panel 100, an internal drive circuit 120 having the scanning line drive circuit 104 and the data line drive circuit 101 and a plurality of terminals 102 are provided in the peripheral region of the TFT array substrate 10.

The plurality of terminals 102 are provided in one rectangular shape region 130 that is located in a portion along one side of the image display region 110 of the peripheral region of the TFT array substrate 10 in such a manner that they are arranged along the plural sides of the one rectangular shape region 130. In FIG. 3, in addition to the terminals 102b, which are arranged along one side of the one region 130 that faces one side of the image display region 110 among three sides of the one region 130, by providing a terminal 102s to the other two sides of the one region 130, the entire terminals 102 are provided onto the one region 130. Here, the plurality of terminals 102 may be arranged along the two sides of the one region 130. Moreover, the one region 130 may have a polygon shape rather than a rectangular shape as the planar shape thereof. Therefore, even if the entire portion of the plurality terminals 102 can not be arranged to the one side of the one region 130, it becomes possible to arrange the entire plurality of terminals 102 onto the one region 130 without narrowing the pitch between terminals, by arranging the terminal 102s to the other sides of the one region 130 having no terminals provided thereto.

Further, it becomes possible to change the size of the one region 130 by extending or compressing the TFT array substrate 10 to only one side of the image display region 110, that is the lower side of FIG. 3. Therefore, compared to the case where the plurality of mounting areas are secured by extending the TFT array substrate 10 in each side of the image display region 110, it is advantageous when the liquid crystal device 1 is made to have a small size with respect to the longitudinal direction of FIG. 3. This is particularly advantageous when it is used in a cellular phone where it is preferable in nature to have a relatively narrower size with respect to a longitudinal direction thereof, or the case where it is preferable to have a screen that occupies the entire area in a longitudinal direction thereof.

Figure 4A:
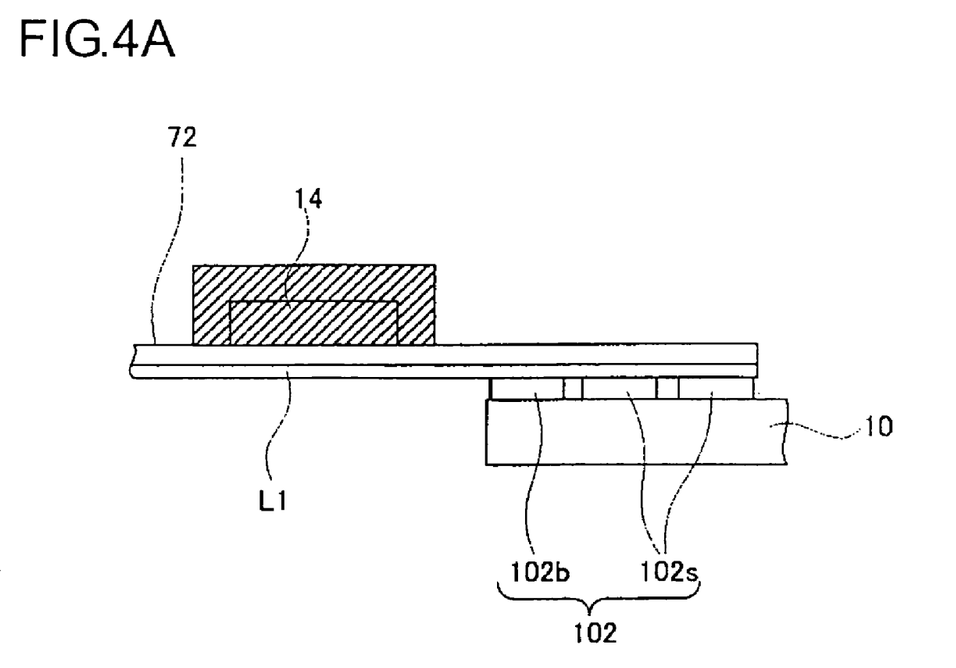
FIGS. 4(a) and 4(b) are sectional views showing the construction of main parts concerning the mounting of a mounting component.
Figure 4B:
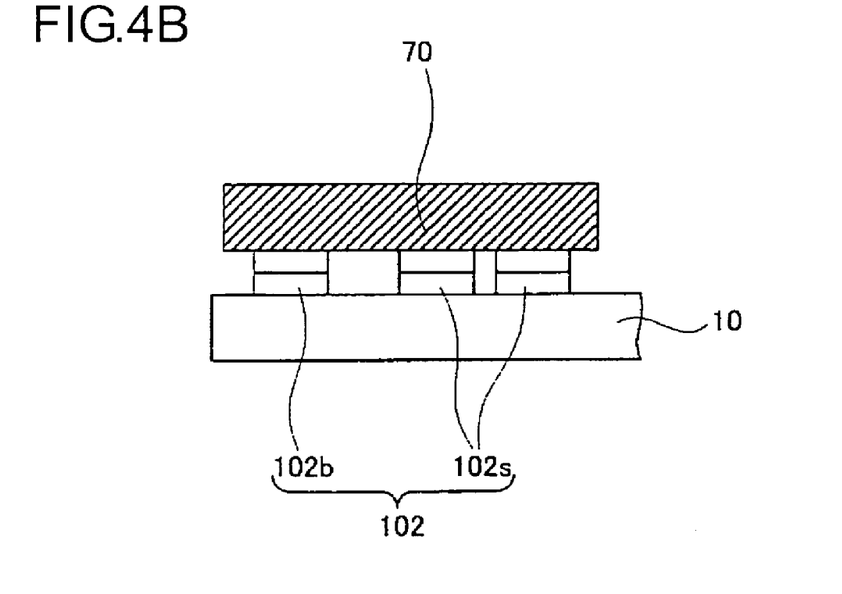

FIGS. 4(a) and 4(b) are sectional views showing the construction of the main part concerning the mounting of a mounting component 70. In FIG. 4(a), the mounting component 70 is formed on the flexible substrate 72, and is mounted on the liquid crystal panel 100 by connecting a plurality of wires L1 that is connected to the external drive circuit 14 and a portion of or the entire portion of the plurality of terminals 102 in a direction that is vertical to the arrangement direction of the terminals 102 via the anisotropic conductive film having an electric conductivity. Here, as shown in FIG. 4(b), it is also possible to mount the mounting component 70 on a portion of or the entire portion of the plurality of terminals 102 by means of COG.

Therefore, even when the number of terminals is increased by securing the mounting area, because it requires only a mounting component 70, it becomes possible to mount the mounting component 70 without increasing the number of mounting process. Thus, it becomes possible to shorten the mounting time and reduce the cost that is taken in manufacturing the mounting components 70 and mounting itself, compared to the case where a plurality of mounting components are mounted.

Further, by arranging the plurality of terminals 102 in only one region 130 without narrowing the pitch therebetween, it becomes possible to make the alignment of the plurality of terminals 102 and the wires at the side of the mounting component 70 relatively easily and correctly. It is thus possible to prevent poor mounting of the mounting component 70. As a result, the liquid crystal device 1 can be manufactured at low cost and it becomes possible to improve the yield in this manufacturing process further.

Here, with attentions only paid to the construction concerning the arrangement of the plurality of terminals 102, the layout of the plurality of wires on TFT array substrate 10, which are connected to the plurality of terminals 102 is omitted in FIG. 3. The plurality of wires on TFT array substrate 10 is constructed in correspondence to the arrangement of the plurality of terminals 102. Therefore, by such arrangement of the plurality of terminals 102, it becomes possible to reduce a situation where the plurality of wires are crossed by one another and to prevent the noise generation when they are driven.

The data line drive circuit 01 and the scanning line drive circuit 104 are driven by a power supplied from the mounting component 70 through any one of the plurality terminals 102. In the scanning line drive circuit 104, the Y clock signal YCK, the inverted Y clock signal YCKB, and the Y start pulse DY are supplied from the mounting component 70 through any one of the plurality terminals 102. When the Y start pulse DY is inputted, the scanning line drive circuit 104 sequentially generates and outputs scan signals Y1, . . . , Ym at a timing based on the Y clock signal YCK and the inverted Y clock signal YCKB.

Moreover, in the data line drive circuit 101, similar to the scanning line drive circuit 104, the R signal 40R, the G signal 40G, and the B signal 40B are supplied in addition to the X clock signal XCK, the inverted X clock signal XCKB, and the start pulse DX. Upon receiving the X start pulse DX, the R signal 40R, the G signal 40G, and the B signal 40B, the data line drive circuit 01 outputs the R signal 40R, the G signal 40G, and the B signal 40B respectively as an image signal X1, X2, . . . , Xn at a timing based on the X clock signal XCK and the inverted X clock signal XCKB.

Further, the liquid crystal panel 100 comprises data lines 114 and scanning lines 112 that are wired in row and column directions in the image display region 110 that occupies the center of the TFT array substrate, and further comprises the pixel electrode 118 arranged in a matrix form and a TFT 116 for controlling the switching of pixel electrodes 118 at the pixel units corresponding to the intersection points of the data lines 114 and scanning lines 112. In this embodiment, it is assumed that the total number of scanning lines 112 is m (m is an integer more than 1) and that the total number of data line 114 is n (n is an integer more than 1).

The data line drive circuit 101 supplies image signals X1, X2, . . . , Xn to each of the data lines 114 in such a manner that the image signals X1, X2, . . . Xn are supplied line sequentially in this order, or supplied to each group of neighboring data lines 114. In FIG. 3, with attention to the construction of one pixel unit, the source electrodes of TFTs 116 are electrically connected to the data lines 114 to which image signals Xi (i=1, 2, 3, . . . , n) are supplied from the data line drive circuit 101. At the same time, the gate electrodes of TFTs 116 are electrically connected to scanning lines 112 to which scan signals Yj (j=1, 2, 3, . . . m) are supplied. Moreover, the drain electrodes of TFTs 116 are electrically connected to the pixel electrodes 118. Thus, each pixel unit is comprised of the pixel electrode 118, the opposing electrode 21 formed on the counter substrate 20, and liquid crystal interposed between those electrodes. As a result, each pixel unit is arranged in a matrix form at locations corresponding to the intersection points of the scanning lines 112 and the data lines 114.

The pixel electrode 118 can write the image signals X1, X2, . . . , Xn that are supplied from data lines 114, at a predetermined timing, by switching off TFT 116 being a switching element for a predetermined time period.

The image signals X1, X2, . . . , Xn which have a predetermined level thereof and were written into the liquid crystal via the pixel electrodes 118 are maintained between the opposing electrodes 21. When the orientation and order of a molecular group of the liquid crystal are changed by the voltage levels applied thereto, the liquid crystal can modulate light and thus enables a gradation display. If it is in a normally white mode, the transmittance with respect to incident light will be decreased according to the voltage applied in the unit of each pixel. On the other hand, if it is in a normally black mode, the transmittance with respect incident light will be increased according to the voltage applied in the unit of each pixel. As a whole, the light having contrast corresponding to the image signals X1, X2, . . . , Xn is output from the liquid crystal panel 100.

Here, in order to prevent held image signals from leaking, a storage capacitor 119 is provided parallel to the liquid crystal capacitor which is formed between the pixel electrodes 118 and the counter electrode 21. For example, because the voltage in the pixel electrodes 118 is maintained at the storage capacitor 119 for a time period that is 3-digit longer than the time period when the source voltage was applied thereto, thus the maintenance characteristics is improved and it becomes possible to realize a high contrast ratio.

As explained above, according to liquid crystal device 1 of this embodiment, it is particularly advantageous when making it with a small size and with high definition.

In addition, an "external drive circuit" may be formed by additionally forming a data line drive circuit 101 and a scanning line drive circuit 104 on the outer substrate 74. In this case, the scan signals Yj and the image signals Xi will be supplied to each scanning line 112 and each data line 114 through any one of the plurality terminals 102 as a "drive signal."

<3: Modified Embodiment>

Figure 5:
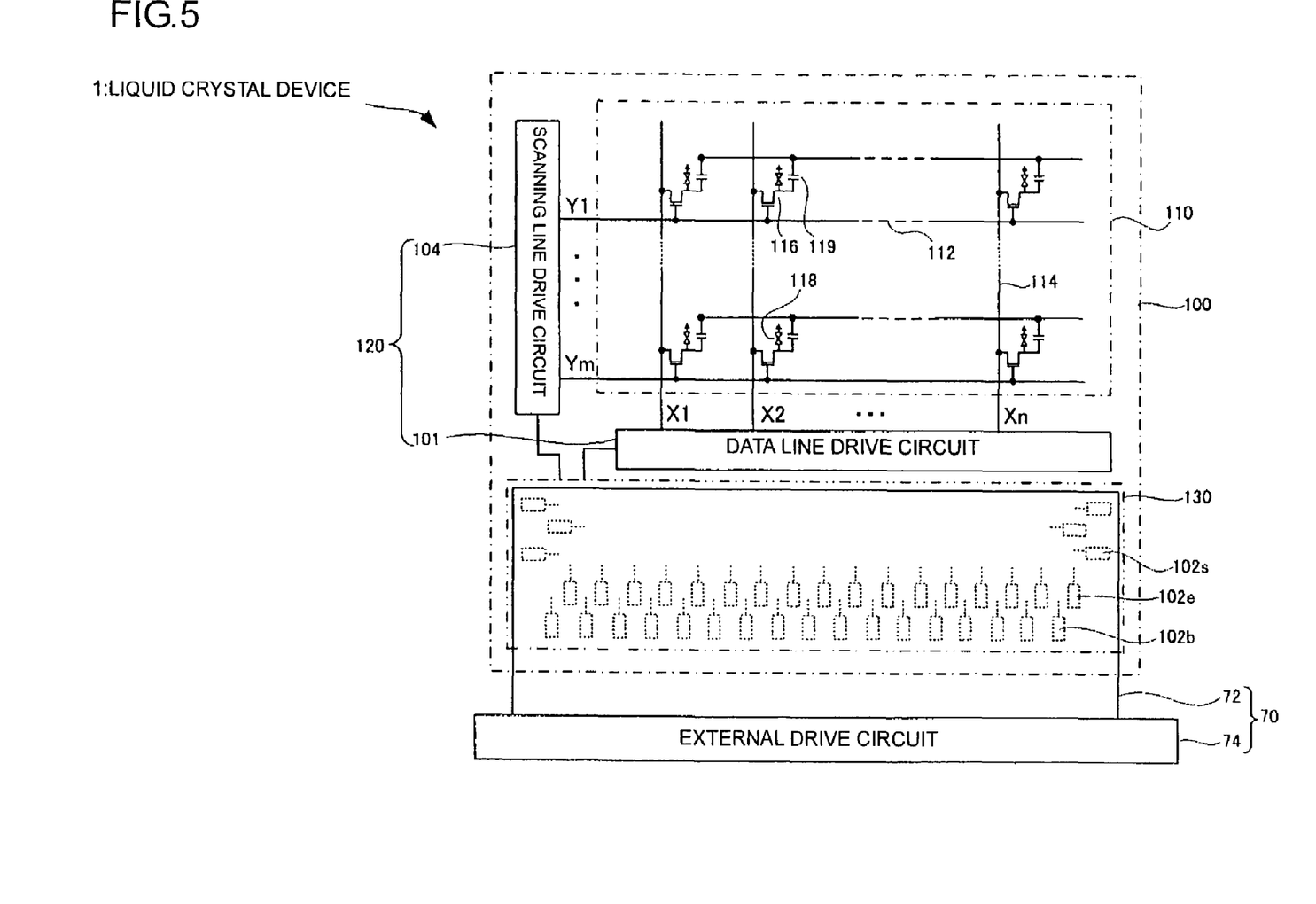
FIG. 5 is a block diagram showing an entire construction of a liquid crystal device according to a modified embodiment.
Figure 6:
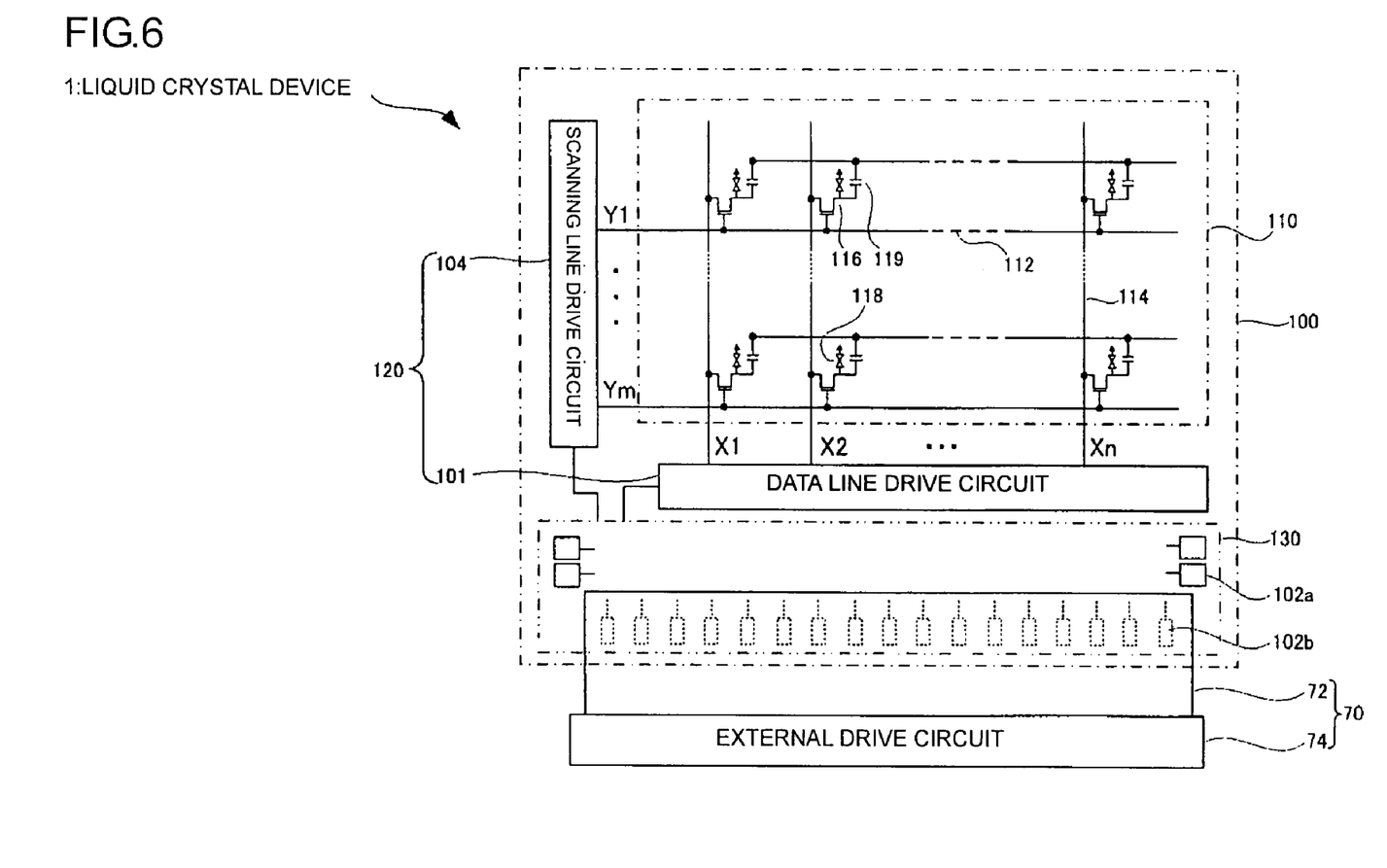
FIG. 6 is a block diagram showing an entire construction of a liquid crystal device according to other modified embodiment.
Figure 7:
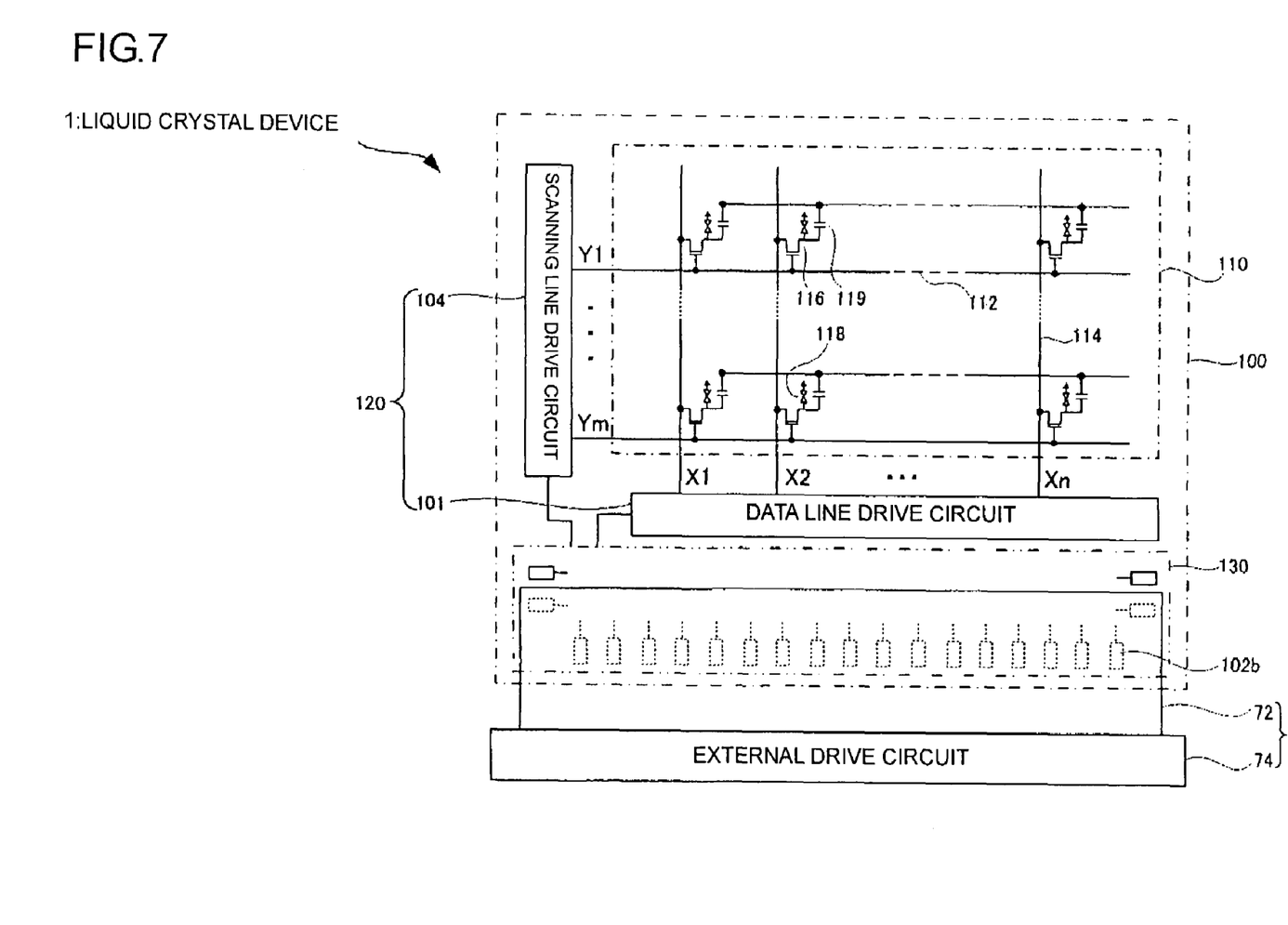
FIG. 7 is a block diagram showing an entire construction of a liquid crystal device according to another modified embodiment.
Figure 8:
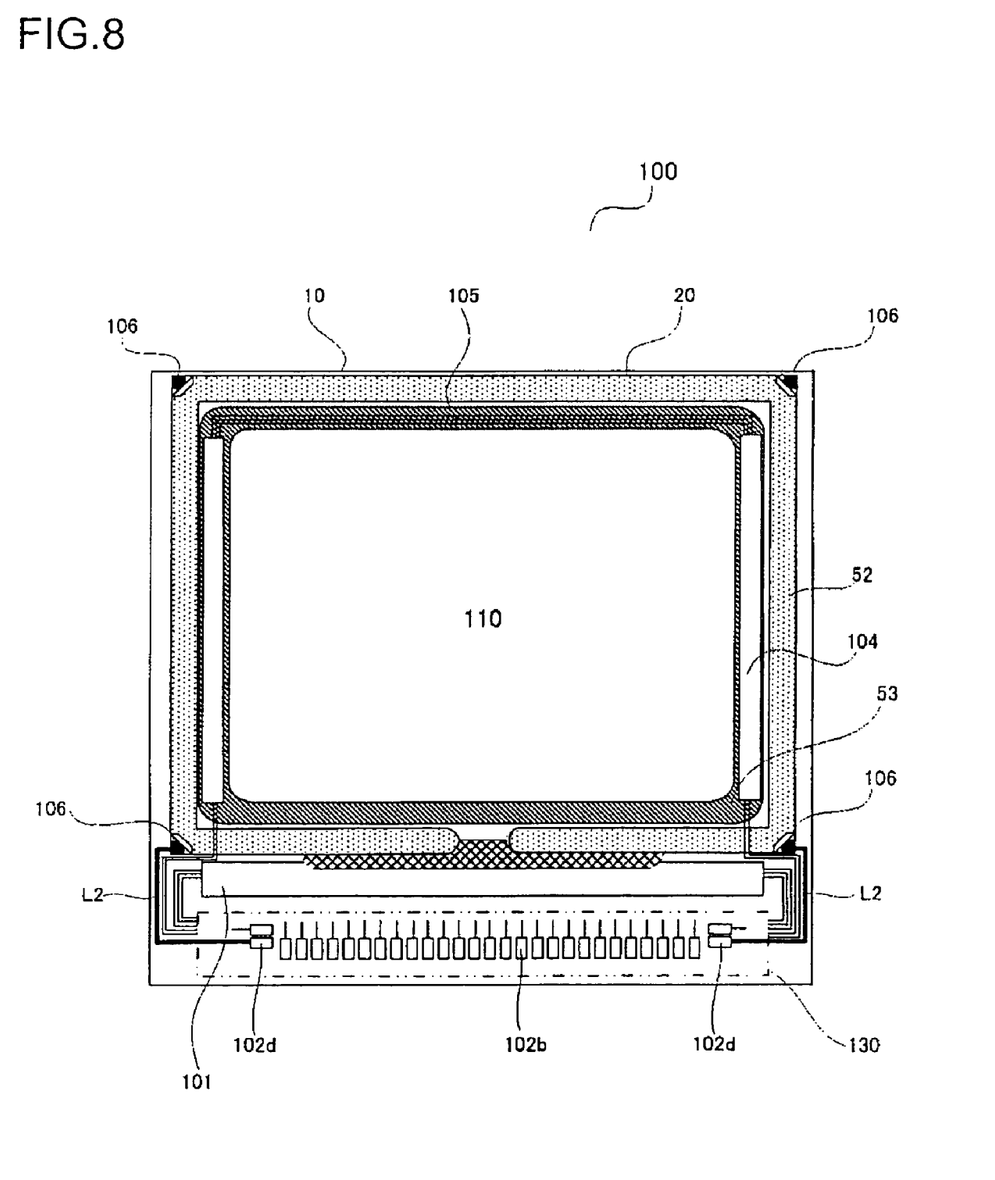
FIG. 8 is a schematic plan view of a liquid crystal device according to another modified embodiment.

Modified embodiment of this embodiment explained above will be explained with reference to FIGS. 5 to 8. FIG. 5 is a block diagram showing the entire construction of the liquid crystal device according to a modified embodiment. FIGS. 6 and 7 are block diagrams showing the entire constructions of the liquid crystal devices according to another modified embodiments. FIG. 8 is a schematic plan view of the liquid crystal device according to still another modified embodiment. In FIGS. 5 to 7, the outer substrate 74 is shown in block with a description "external drive circuit" to simplify construction thereof.

Firstly, in FIG. 5, the plurality of terminals 102 may be at least partially arranged in a zigzag in one region 130. For example, when it is difficult to arrange the entire plurality of terminals 102 to each sides of the one region 130 in a sequence, it is preferable to arrange the terminal 102e, which cannot be arranged, in a zigzag. Therefore, it becomes possible to increase the number of terminals that can be arranged to the one region 130 without narrowing the pitch between terminals. Therefore, the number of terminals that can be arranged to the one region 130 can be increased by extending TFT array substrate 10 to one side of the image display region 110 and changing the size of the TFT array substrate 10.

Next, in FIGS. 6 and 7, the mounting component 70 is mounted onto only some terminals 102b of the plurality of terminals 102. In FIG. 6, the some terminals 102b is arranged along only one side of the one region 130, the only one side facing the image display region 110. Moreover, other terminals 102a excluding the some terminals 102b among the plurality of terminals 102 are mounted to be used as an inspection terminal. It is preferable to construct the inspection terminal 102a to have a size relatively greater than the some terminals 102b.

In addition, some terminals 102a among the other terminals 102a may also be provide as the inspection terminals. In this case, it is preferable to construct the inspection terminal to have a relatively greater size compared to those of the some terminals 102b and the other terminals 102a other than the inspection terminal.

Therefore, according to the liquid crystal device 1 shown in FIG. 6, various kind of signals for driving each pixel unit in the image display region 110 are supplied from the mounting component 70 to the some terminals 102b having the mounting component 70 mounted thereon. Therefore, downsizing of the mounting component 70 can be attained, and the production cost of the mounting component 70 can be reduced, and also it becomes possible to shorten the mounting time. Moreover, since the alignment of the some terminals 102b and the wires at the mounting component 70 sides can be performed relatively easily and correctly, it becomes possible to prevent poor mounting of the mounting component 70.

Moreover, when the liquid crystal device 1 is inspected, a probe pin is connected to the inspection terminals 102a and an inspection signal is supplied from the probe pin. According to the construction of the liquid crystal device 1 shown in FIG. 6, alignment of the probe pin and the inspection terminals 102a can become relatively easy, and a situation can be prevented where the probe pin is omitted from the inspection terminals 102a during the inspection, and thus more exact inspection can be conducted.

As mentioned above, it also becomes possible to reduce the electrical resistance of any one of the some terminals 102b by enlarging the size of the any one of the some terminals 102b in place of or in addition to the inspection terminals 102a.

As shown in FIG. 7, the some terminals 102b having the mounting component 70 mounted thereon may be arranged along plural sides of the one region 130. According to this arrangement, even when the some terminals 102b are arranged along the plural sides of one region 130, since the some terminals 102b have only one mounting component 70 mounted thereon, it becomes possible to shorten mounting time thereof and to cut down cost taken in the production and mounting of the mounting component 70. Moreover, by the arrangement of the some terminals 102b, it becomes possible to reduce a situation where the plurality of wires, which the some terminals 102b are connected to, are crossed by one another and to prevent the noise generation when they are driven.

In FIG. 8, when TFT array substrate 10 is seen in plan view, the terminals 102d which are arranged along the other side of the one region 130 may have relatively thicker wires L2 connected thereto compared to the wires that are connected to the terminals 102b which is arranged along one side of the one region 130 that faces one side of the image display region 110. By such arrangement, it is possible to arrange thin wires to the inner side of the one region 130, which faces the image display region 110 as compared to the outer side thereof, and arrange thick wires L2 to the outer side of the one region 130 as compared to the inner side thereof.

Moreover, when the vertical conducting terminals and the terminals 102d arranged along the other sides of the one region 130 described above are connected by wires L2, since the lengths of the wires L2 can be shortened, it becomes possible to reduce the resistances in the wires L2.

<4: Electronic Apparatus>

Next, the case where the liquid crystal device 1 mentioned above is applied by various kinds of electronic apparatuses will be explained.

<4-1: Projector>

Figure 9:
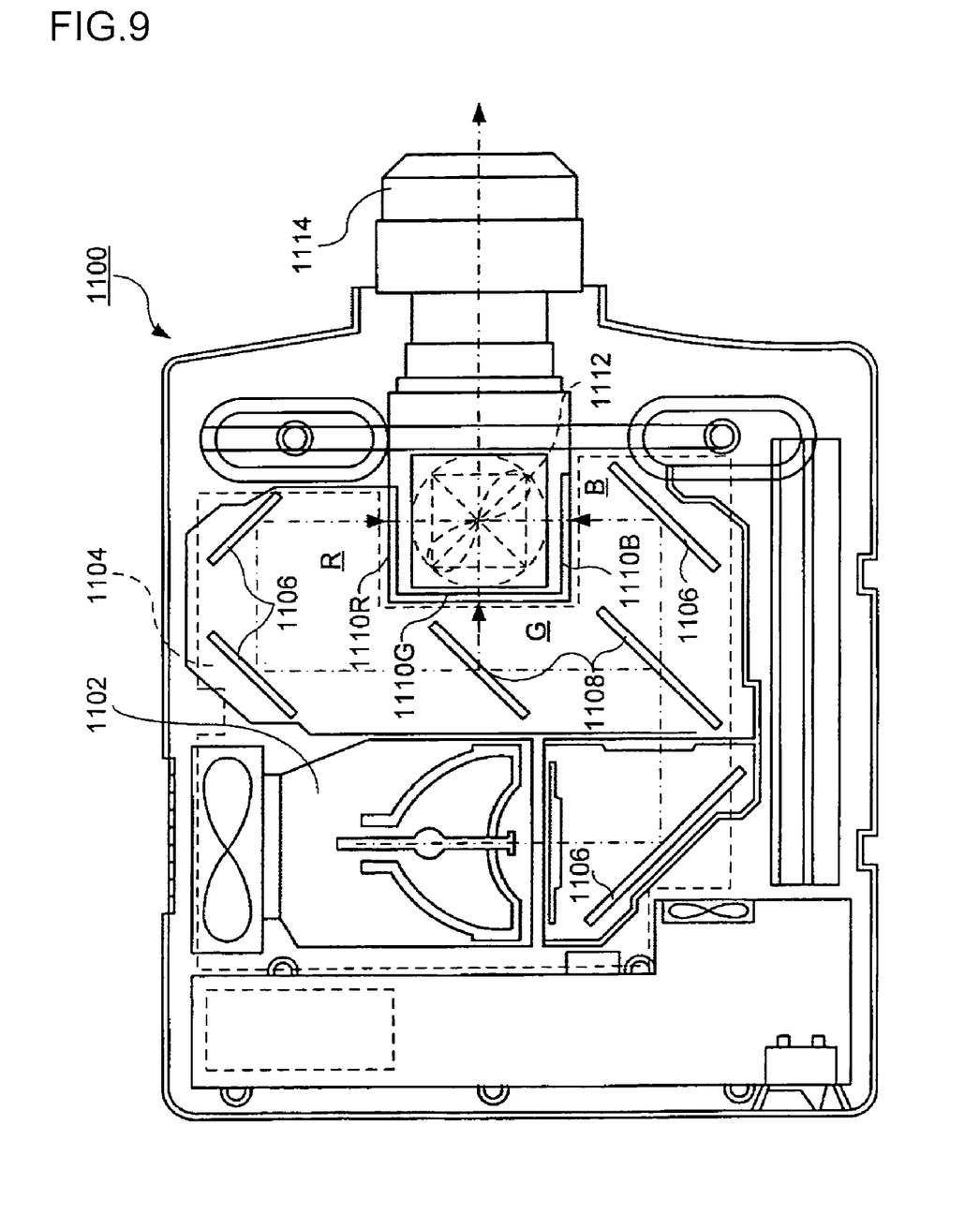
FIG. 9 is a plan view showing a construction of a projector as an example of an electronic apparatus using the liquid crystal device.

First, a projector using this liquid crystal device 1 as a light valve will be explained. FIG. 9 is a plane view showing an example of construction of a projector. As shown in this figure, the projector 1100 comprises a lamp unit 1102, which consists of white light sources, such as a halogen lamp, is formed in the inner side thereof. This projection light that was emitted from the lamp unit 1102 is separated into three primary colors of RGB by four pieces of mirrors 1106 and two dichroic mirrors 1108 arranged in a light guide 1104 and is entered to liquid crystal panels 1110R, 1110B, and 1110G, which serve as a light valve corresponding to each primary color, respectively.

The liquid crystal panels 110R, 1110B, and 1110G which are constructed similar to the liquid crystal panel 100 mentioned above, are driven respectively by the primary color signal of R, G, and B which are supplied from an image signal processing circuit. The light modulated by these liquid crystal panels is entered to a dichroic prism 1112 from three directions. In this dichroic prism 1112, while the lights of R and B are refracted at 90 degrees, the light of G goes straight on. Therefore, as a result of image composition of each color, a color image will be projected to the screen or the like through a projection lens 1114.

Here, with attention to display images by each liquid crystal panels 110R, 1110B, and 1110G, it is necessary for the display image by the liquid crystal panel 1110G to carry out right-and-left reversal with respect to the display images by the liquid crystal panels 1110R and 1110B.

In addition, since the lights corresponding to each primary color of R, G, and B are incident on the liquid crystal panels 1110R, 1110B, and 1110G by mean of by the dichroic mirrors 1108, it is not necessary to provide a color filter to the liquid crystal panels 1110R, 1110B, and 1110G.

<4-2: Mobile Type Computer>

Figure 10:
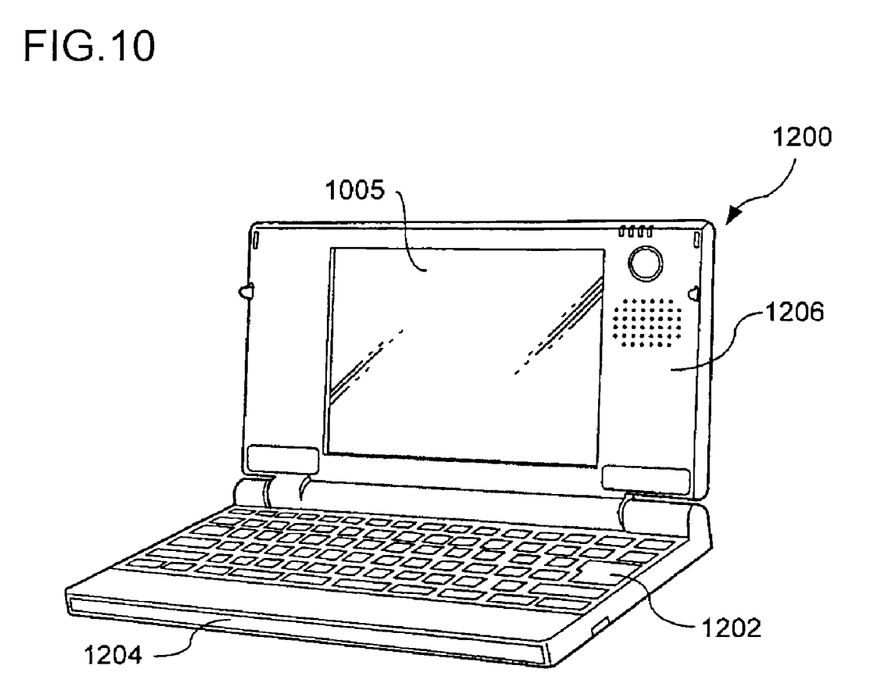
FIG. 10 is a perspective view showing a construction of a personal computer as other example of the electronic apparatus using the liquid crystal device.

Next, an example, which applied the liquid crystal panel to a mobile type personal computer, will be explained. FIG. 10 is a perspective view showing a construction of the personal computer. In the figure, a computer 1200 comprises a main part 1204 equipped with a keyboard 1202, and a liquid crystal display unit 1206. This liquid crystal display unit 1206 is constituted by adding a back light to the back of the liquid crystal panel 1005 described previously.

<4-3: Cellular Phone>

Figure 11:
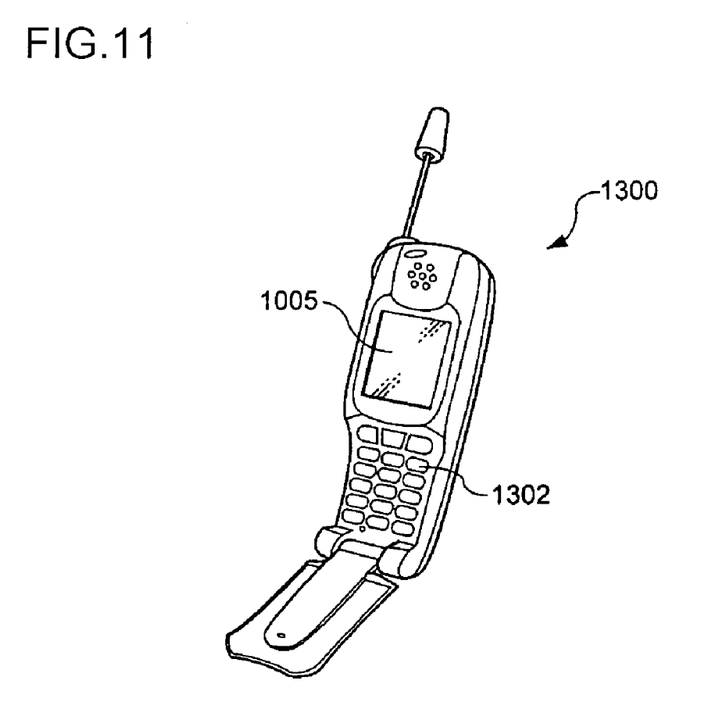
FIG. 11 is a perspective view showing the construction of a cellular phone as another example of the electronic apparatus using the liquid crystal device.

In addition, an example that applied the liquid crystal panel to a cellular phone will be explained. FIG. 11 is a perspective view showing a construction of the cellular phone. In a figure, a cellular phone 1300 is equipped with a reflection type liquid crystal panel 1005 with a plurality of operation buttons 1302. In this reflection type liquid crystal panel 1005, if needed, a front light is provided in the front face thereof.

Moreover, examples other than the electronic apparatuses which were explained with reference to FIGS. 9 to 11 include devices such as the liquid crystal televisions, a view finder type and a monitor direct view type video tape recorders, car navigation equipments, pagers, electronic notebooks, electronic calculators, word processors, workstations, TV phones, POS terminals, and devices equipped with touch panel, etc. Needless to say, the present invention can be applied to these various electronic apparatuses.

The present invention is not restricted to the exemplary embodiment mentioned above, and can be suitably changed without departing from the spirit and scope of the present invention as defined by the following claims and detailed description thereof and the electro-optical device and the electronic apparatus incorporating the electro-optical device accompanied by such change is also deemed to be fall into the technical range of the present invention.

What is claimed is:

1. An electro-optical device, comprising:
   a first substrate;
   a second substrate disposed in opposition to the first substrate, the second substrate including a protruding section that protrudes beyond the first substrate in plan view, the protruding section of the second substrate having an edge;
   a liquid crystal layer disposed between the first substrate and the second substrate;
   a plurality of pixel units disposed in an image display region of the second substrate, the pixel units being driven based on drive signals;
   a drive circuit disposed at a position between the plurality of pixel units and the edge of the second substrate in plan view;
   a plurality of terminals disposed at a position between the drive circuit and the edge of the second substrate in plan view, the plurality of terminals including a first plurality of terminals juxtaposed in a first direction along the edge of the second substrate and a second plurality of terminals juxtaposed in a second direction, the first direction being substantially perpendicular to the second direction, at least one of the second terminals being located at a position at least partially within a range in the second direction defined by a width of the first plurality of terminals in the second direction;
   a first wire connected to one of the first plurality of terminals and extending in the second direction from the one of the first plurality of terminals toward the drive circuit;
   a second wire connected to the at least one of the second terminals and extending in the first direction from the at least one of the second terminals, the second wire being located at a position that is farther from the image display region than the first wire; and
   a flexible substrate which is mounted onto at least one terminal among the plurality of terminals, the flexible substrate having a plurality of wires provided thereon for supplying the drive signal to the plurality of pixel units through at least the one terminal among the plurality of terminals.

2. The electro-optical device according to claim 1, wherein the at least one terminal among the plurality of terminals is arranged along plural sides of a rectangular-shaped region.

3. The electro-optical device according to claim 1, wherein the at least one terminal among the plurality of terminals is arranged along only one side of plural sides of a rectangular-shaped region.

4. The electro-optical device according to claim 1, wherein other terminals, excluding the at least one terminal among the plurality of terminals, have an inspection terminal.

5. The electro-optical device according to claim 4, wherein the inspection terminal has a relatively larger size than the other terminals, excluding the inspection terminal and the at least one terminal among the plurality of terminals.

6. The electro-optical device according to claim 1, wherein an external drive circuit for generating the drive signal is connected to the flexible substrate.

7. The electro-optical device according to claim 1, further comprising a plurality of third wires connected to at least one terminal of the first plurality of terminals, the second wire being thicker than the third wires as viewed in plan and being located at a position that is farther from the image display region than the third wires.

8. The electro-optical device according to claim 1, the second wire being thicker than the first wire as viewed in plan.

* * * * *